C. R. SNYDER.
Ladies' Work-Table.
No. 6,475. Reissued June 1, 1875.
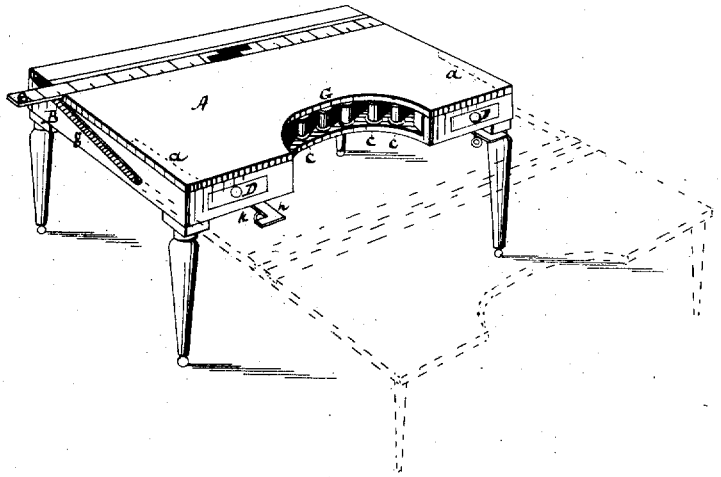
WITNESSES.
F. B. Townsend.
James Stevenson.
INVENTOR.
Chas. R. Snyder
per Attys.
A. H. Evans & Co

UNITED STATES PATENT OFFICE.

CHARLES R. SNYDER, OF MINNEAPOLIS, MINNESOTA.

IMPROVEMENT IN LADIES' WORK-TABLES.

Specification forming part of Letters Patent No. 157,355, dated December 1, 1874; reissue No. 6,475, dated June 1, 1875; application filed May 10, 1875.

*To all whom it may concern:*

Be it known that I, CHARLES R. SNYDER, of Minneapolis, Minnesota, have invented certain new and useful Improvements in Ladies' Work-Tables; and I hereby declare the following to be a full, clear, and exact description thereof, reference being had to the accompanying drawings making a part of this specification, in which the figure is a perspective view of my invention.

The object of my invention is to produce a neat, complete, and convenient form of a lady's work-table, with a lid thereto, constructed in such a manner that it may be thrown in any desired position and utilized as a lap-board.

In the said drawing, B represents a lady's work-table. A is a lap-board, shaped to fit and serve as a top to the table, to which it may be attached by elongated hinges *g*, whereby the board may be conveniently lifted entirely from the table and lowered to the lap, to be used as a lap-board when desired. Should it become necessary or desirable to remove the lap-board A from the table B entirely, the hinges *g* can be unpivoted and the elongated hinge be used as legs for the board. *e* is a graduated scale or rule, which slips into a beveled slot or groove in the top A, forming the cover to an aperture, which may be utilized for any desired purpose. D D represent drawers, divided on the inside in any suitable manner. *ccc* represent cavities for spools of thread, their arrangement being secured and retained by suitable wires passing through their centers, the same being attached to the table proper. The skein-holders *h* are made adjustable by means of the thumb-nut and its counter-bolt *k*, said bolt working in an elongated slot, allowing the skein-holders to be placed closer together or farther apart, as may be desired. Underneath the top A are secured the legs *a*, folding within the table when the top is on, but unfolding and acting as supports when the top is being used as a lap-board. The curve G in the front of the table is to accommodate it to the person using table or lap-board.

I am aware that meal-chests with a cover adjusted by links connected to the rear part of the cover and the side of the chest, whereby the cover may be used as a leaf or stand, are old.

What I claim is—

A lady's work-table having a cover of such form and construction as to adapt it to use as a lap-board, attached to the table by links pivoted to the latter in front of a longitudinal median line, that the rear edge of the lap-board may be brought over and dropped, below the front edge of the table, upon the lap, substantially as and for the purpose set forth.

CHARLES RIDGWAY SNYDER.

Witnesses:

GEO. W. CHOWEN,
H. O. CHOWEN.